Patented Aug. 15, 1944

2,355,972

UNITED STATES PATENT OFFICE 2,355,972

PROCESS FOR TREATING 2-HYDROXY-1-DITHIONAPHTHOIC ACID AND PRODUCT RESULTING THEREFROM

Albert F. Hardman, Akron, Ohio, assignor to Wingfoot Corporation, Akron, Ohio, a corporation of Delaware No Drawing. Application August 29, 1941, Serial No. 408,758

5 Claims. (Cl. 260—333)

This invention relates to a chemical process, to the products obtained thereby, and to the use of these products. More particularly, it relates to treatment of 2-hydroxy dithionaphthoic acids in such a manner as to remove hydrogen sulfide. The products are useful as accelerators of the vulcanization of rubber.

The compound, 2-hydroxy-1-dithionaphthoic acid can be prepared as follows: A mixture of 40 grams of sodium hydroxide, 144 grams of beta naphthol and 1500 cc. of acetone is refluxed on a steam bath until the sodium hydroxide is largely dissolved, only a short time being required, to produce a solution of sodium naphtholate. This solution is then cooled slightly and 120 grams of carbon bisulfide are added and refluxing is resumed. Orange-red crystals begin to separate within a few minutes. At the end of ½ hour another 40-gram portion of sodium hydroxide is added and at the end of a further hour a third 40-gram portion of sodium hydroxide is added. After another hour of refluxing the warm acetone liquor and crystals are decanted from the heavy layer of water saturated with sodium hydroxide. The crystals are filtered out of the acetone, washed with fresh acetone and dried. The product is disodium 2-hydroxy dithionaphthoate with which is associated 2 mols of acetone per mol of salt. Thirty grams of this disodium salt are then dissolved in 200 cc. of cold water and this solution is slowly stirred into 200 cc. of cold dilute hydrochloric acid, orange-colored crystals separating out. These crystals, which are 2-hydroxy-1-dithionaphthoic acid, melt with decomposition at about 95° C. and after recrystallization from warm benzene melt at 99° C.

The free acid is somewhat unstable and slowly decomposes with the evolution of hydrogen sulfide. This elimination of hydrogen sulfide can be facilitated by various means, including the use of reduced pressure and the application of heat. It is easily accomplished by heating the dithioacid in a dry organic solvent such as benzene or toluene. A trace of an organic base promotes the reaction but is not absolutely essential. Representative examples of such bases are piperidine and diphenylguanidine. Also, if desired, a larger amount of a substance which will combine chemically with and fix the hydrogen sulfide may be added. A large number of such substances are known—examples being zinc oxide, calcium hydroxide and sodium hydroxide.

The following example illustrates the practice of the process of the invention.

Example

Forty-four grams of 2-hydroxy-1-dithionaphthoic acid were dissolved in 250 cc. of benzene to which a few drops of piperidine had been added. The solution was stirred and heated under reflux and a rapid evolution of hydrogen sulfide took place during the first 10–15 minutes of reaction, a maroon-colored crystalline suspension separating out. The heating and stirring were continued for about 1½ hours and the crystalline product was then filtered off and washed with 50 cc. of benzene. The product was a dark-red, crystalline powder which weighed 29.5 grams and melted at 278–280° C. Analysis showed that it had a sulfur content of 17.49%. A compound having the formula $C_{11}H_6OS$, resulting from the elimination of one mol of hydrogen sulfide per mol of the dithioacid, has a calculated sulfur content of 17.2%. The exact structural formula of the product is not known for certain but it is believed to be

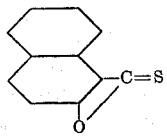

or, as indicated by its high melting point and slight solubility, a polymer of this or similar structure.

Various other solvents may be used instead of the benzene of the foregoing example and in fact the reaction may be carried out in the absence of any solvent. As previously stated, the reaction is facilitated by the use of reduced pressure, whether or not heat is applied.

Although the exact structural formula is not known for certain, the characteristics of the product show that it is a definite chemical compound resulting from the elimination of one mol of hydrogen sulfide from a mol of the dithio acid and the process broadly includes treating the dithio acid to remove a mol of hydrogen sulfide.

In addition to the parent 2-hydroxy-1-dithionaphthoic acid, various substituted 2-hydroxy-1-dithionaphthoic acids may also be employed such as those containing alkoxy, aryloxy, hydroxyl, alkyl, aryl, aralkyl, halogen and other radicals, which for the purpose of the present invention are substantially inert. These substituted dithio acids, when used in the process of the invention, are equivalents of 2-hydroxy-1-dithionaphthoic acid and their use and the products obtained are intended to be covered by the claims.

The products of the invention are useful as acceleraotrs of the vulcanization of rubber. They are relatively slow accelerators when used along but are very effective when activated with a basic auxiliary accelerator such as diphenylguanidine, giving good cures at low temperatures and without any tendency to scorch.

The product of the example was incorporated into rubber in accordance with the following formula in which the material of the invention is designated as the accelerator:

| | Parts by weight |
|---|---|
| Smoked sheets | 100.0 |
| Zinc oxide | 5.0 |
| Sulfur | 3.0 |
| Diphenylguanidine | 0.2 |
| Accelerator | 0.5 |

Samples of the rubber so compounded were vulcanized and tester to give the following results:

| Time in mins. at °F. | Tensile, kgs./cm.$^2$ | Ult. elg. in per cent | Modulus at 500 per cent elong. in kg./cm.$^2$ |
|---|---|---|---|
| 20/260 | 112 | 860 | 14 |
| 30 | 149 | 815 | 20 |
| 40 | 166 | 775 | 27 |
| 60 | 186 | 755 | 34 |
| 80 | 187 | 745 | 35 |

I claim:

1. A process which comprises removing one mol of hydrogen sulfide from one mol of 2-hydroxy-1-dithionaphthoic acid.

2. A process which comprises heating 2-hydroxy-1-dithionaphthoic acid with the elimination of one mol of hydrogen sulfide per mol of the acid.

3. A process which comprises heating 2-hydroxy-1-dithionaphthoic acid in the presence of an organic base with the elimination of one mol of hydrogen sulfide per mol of the acid.

4. A process which comprises heating a solution of 2-hydroxy-1-dithionaphthoic acid with the elimination of one mol of hydrogen sulfide per mol of the acid.

5. As a new composition of matter, the compound resulting from the removal of one mol of hydrogen sulfide from a mol of 2-hydroxy-1-dithionaphthoic acid.

ALBERT F. HARDMAN.